Dec. 22, 1959 R. A. WITTREN 2,918,135
HYDRAULIC SYSTEM, ESPECIALLY FOR STEERING
Filed Feb. 18, 1957 2 Sheets-Sheet 1
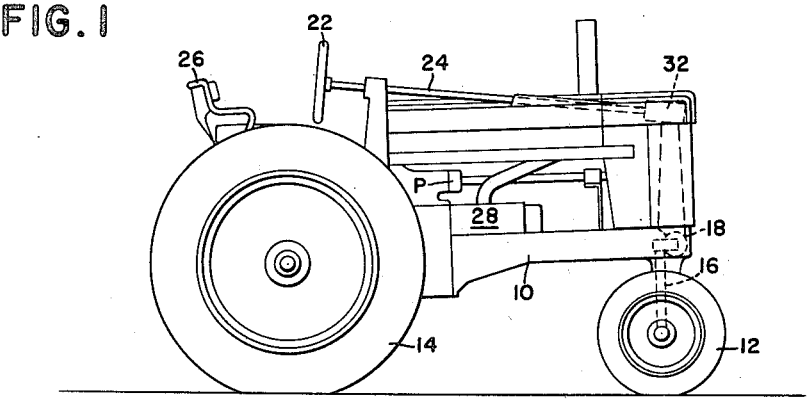
FIG. 1
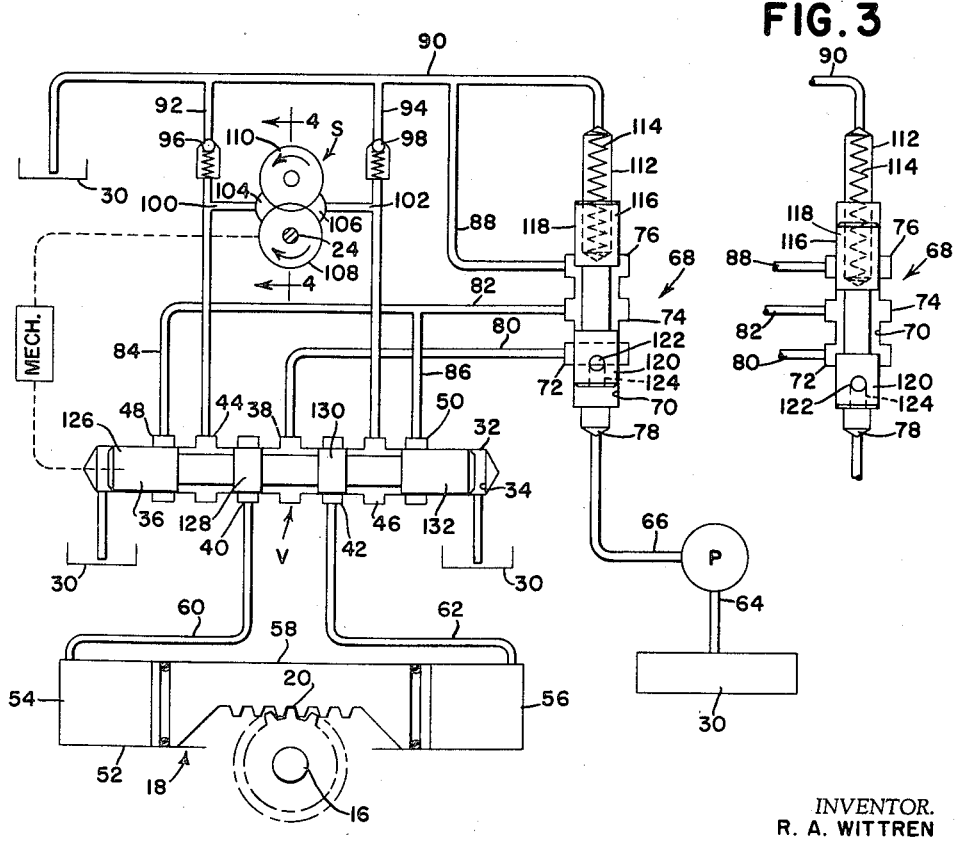
FIG. 2
FIG. 3
INVENTOR.
R. A. WITTREN Dec. 22, 1959      R. A. WITTREN      2,918,135
HYDRAULIC SYSTEM, ESPECIALLY FOR STEERING
Filed Feb. 18, 1957      2 Sheets-Sheet 2
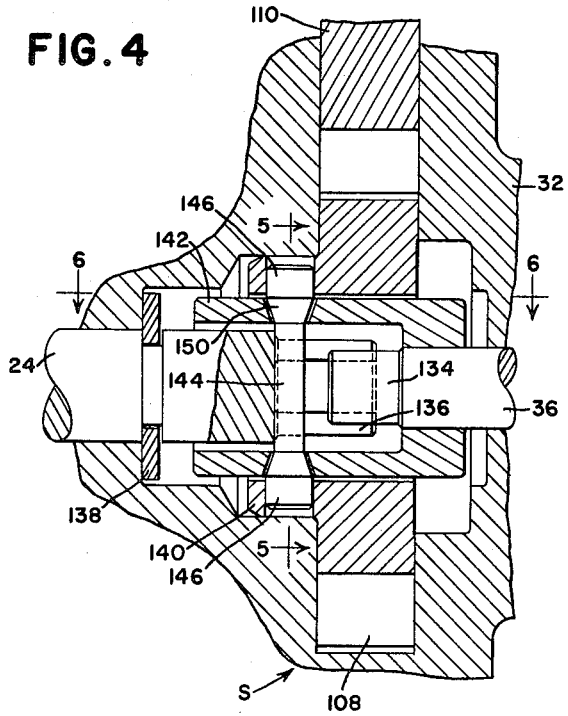
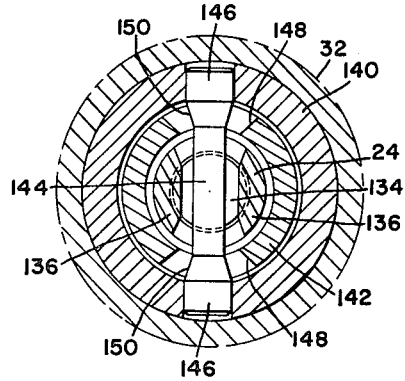
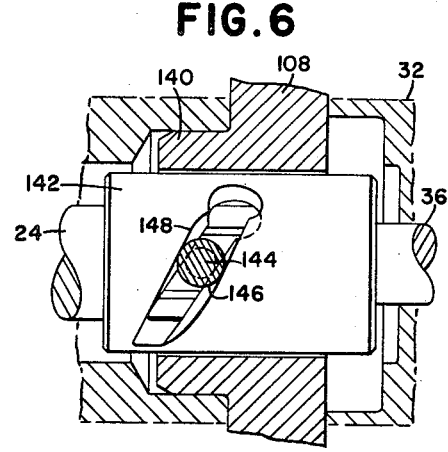
INVENTOR.
R. A. WITTREN

United States Patent Office 2,918,135
Patented Dec. 22, 1959

2,918,135

HYDRAULIC SYSTEM, ESPECIALLY FOR STEERING

Richard A. Wittren, Cedar Falls, Iowa, assignor, by mesne assignments, to Deere & Company, a corporation of Delaware Application February 18, 1957, Serial No. 640,655

17 Claims. (Cl. 180—79.2)

This invention relates to a hydraulic control system especially adapted for use as a hydraulic steering system for vehicles.

The invention has for a principal object the provision of an improved system in which a follow-up or servo action is obtained by driving a secondary pump or motor from the return side of the main motor, as distinguished from prior systems in which the second pump or motor is upstream of the main motor. It is a significant feature of the invention to incorporate in the system means whereby the secondary motor can operate as a pump for actuating the main motor in the event of failure of the main or power-driven pump. In this respect, the invention features the provision of a novel shuttle valve or its equivalent for selectively connecting the main or second pumps to the activated motor, together with an improved control valve for routing the fluid under pressure to selectively achieve the foregoing functions. It is a further object of the invention to provide an improved mechanical interconnection among the second pump or motor, the control member or steering shaft, and the control valve.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

Fig. 1 is a side elevation, on a reduced scale, of an agricultural tractor embodying the improved hydraulic system as part of its power steering means.

Fig. 2 is a schematic view, partly in section, illustrating the hydraulic circuit.

Fig. 3 is a schematic view of the shuttle valve in the position it occupies when the power driven pump is not operating.

Fig. 4 is an enlarged fragmentary section showing the interconnection between the steering shaft, the steering pump and the control valve.

Fig. 5 is a section on the line 5—5 of Fig. 4.

Fig. 6 is a section on the line 6—6 of Fig. 4.

The vehicle chosen for purposes of illustration is an agricultural tractor having a main body 10 carried on front and rear wheels 12 and 14. The front wheels 12 are in the form of a steerable truck turnable about an upright axis at 16 by means of a hydraulic motor 18 which incorporates rack and pinion means 20 (Fig. 2). This motor forms part of the hydraulic control or steering system to be described in detail below, all of which is initially under control of a control member in the form of a steering wheel 22 mounted on a fore-and-aft steering shaft 24 ahead of an operator's seat 26 on the tractor. The tractor is powered by an internal combustion engine 28 which serves to drive a first or power-driven pump P. Any suitable part of the tractor will serve as a fluid reservoir, disconnected portions of which are shown at 30 in Fig. 2. Additional supporting structure 32 at the forward part of the tractor may be utilized to carry a second pump S and control valve means V. Here again, the details are relatively unimportant, it being material only that the supporting structure 32 affords a housing for the pump S and valve V.

At this point, it should be noted that although the pump S is referred to more often as a "pump," it is a dual-function device, since it serves also as a motor.

The housing 32 has a valve bore 34 in which is axially shiftably carried a control valve member 36, shown in its neutral position in Fig. 2. Since this valve member is axially shiftable, it gives the control valve means its characteristic of being changeable from a neutral status to an active status at either side of the neutral status. The valve housing is provided, in communication with the valve bore 34, with a plurality of ports, including an inlet port 38, right and left hand motor ports 40 and 42, and exhaust or return ports 44 and 46 and 48 and 50. As will be brought out below, the ports 44 and 46 selectively serve as pressure ports, at least to the extent that at times one or the other of them will carry fluid under pressure developed by the device S when acting as a pump. At other times, one or the other of these ports will carry fluid directed to the intake side of the device S when it acts as a motor.

The main or steering motor 18 comprises a cylinder 52 having opposite ends 54 and 56 and carrying a piston 58 which incorporates part of the rack and pinion means 20 previously described. The ends 54 and 56 alternately serve as pressure and return ends, depending upon which end fluid under pressure is supplied to. These ends are connected to the motor ports 40 and 42, respectively, by fluid lines 60 and 62.

The main pump P has its intake side 64 connected to a portion of the reservoir 30 and has its discharge side 66 connected to selector or shuttle valve means 68. A portion of the supporting housing 32 may be utilized to carry the shuttle valve means and for that purpose has a shuttle valve bore 70 connected directly to the discharge side 66 of the power pump P. The bore has spaced axially therealong a supply port 72, a second pump port 74 and an exhaust port 76. The expression "second pump port" is used with reference to a second inlet to the bore 70 in addition to that afforded by the connection between the bore 70 and the discharge side 66 of the pump P, which connection may be considered a first pump port 78.

The supply port 72 is connected by a line 80 to the inlet port 38 of the main control valve means V. The second pump port 74 is connected by a line 82 and branch lines 84 and 86 to the control valve ports 48 and 50, respectively. The exhaust port 76 of the shuttle valve means is connected by a line 88 to a reservoir line 90 and this line includes a pair of branches 92 and 94 which connect respectively to the control valve ports 44 and 46. The lines 92 and 94 respectively incorporate make-up check valves 96 and 98, and these lines are connected below the make-up valves by lines 100 and 102 to opposite sides 104 and 106 of the pump S. These sides are selectively intake and discharge sides, depending upon the direction in which the pump (or motor) is driven. As will be seen, the pump comprises a pair of gears 108 and 110, the first of which is connected to the steering shaft 24 in a manner to be presently described.

The shuttle valve bore 70 is reduced at its upper end at 112 and is connected to the reservoir line 90. A spring 114 in the reduced portion 112 serves to downwardly bias a shuttle valve member 116. This member has upper and lower lands 118 and 120, the latter of which has a cross passage 122 therein which communicates with a short axial passage 124 that opens downwardly to the first pump port 78. When the valve is in its spring-loaded lower position (Fig. 3) the land 118 cuts off the exhaust port 76, and the groove between the two lands interconnects the ports 72 and 74. This condition will obtain when the power pump P is idle. However, when that pump is running, the pressure developed thereby incurs upward shifting of the shuttle valve member 116 against the bias of the spring 114 (Fig. 2) and in that position the lower land 120 cuts off communication between the ports 72 and 74, the passages 122 and 124 connect the discharge side 66 of the pump P to the line 80 via the port 72, and the groove between the lands 118 and 120 interconnects the ports 74 and 76. In other words, the shuttle valve means is responsive to pressure developed by the pump P to assume its Fig. 2 position and is responsive to the absence of such pressure to assume its Fig. 3 position. As will be brought out below, the function of the shuttle valve is to connect the pumps P or S selectively to the motor 18 via the control valve means V.

The control valve member 36 includes a plurality of lands 126, 128, 130 and 132, which lands selectively control the previously described control valve means ports.

The rectangle labeled "Mech." in Fig. 2 represents an interconnection among the steering shaft 24, the device S and the control valve means V. The details of this connection are shown in Figs. 4, 5 and 6, wherein it will be seen that the rear end of the control valve member 36 has a flattened tang 134 which is received between a pair of portions 136 rigid on the bifurcated front end of the steering shaft 24. The steering shaft is confined against axial shifting in the housing 32 as by a plurality of confining rings, one of which appears at 138. The connection 134—136 causes the valve member 36 to be rotated when the steering shaft 24 is rotated, but the connection also enables axial shifting of the valve member relative to the steering shaft which, as already stated, is confined against axial shifting. The rotor or gear 108 of the pump or device S has a hub 140 which encircles a sleeve 142 that is rigidly connected to the valve member 36. A cross member in the form of a double-headed pin 144 diametrically traverses the hub 140, the sleeve 142 and the slot in the steering shaft afforded by the furcations 136. The hub 140 is diametrically apertured in alinement to receive heads 146 on the pin, and the sleeve 140 has a pair of diametrically opposed helical slots 148 which respectively receive tapered portions 150 adjacent to opposite ends of the pin 144. Although the heads 146 of the pin closely fit the diametrically alined apertures in the hub 140, the pin is free to shift axially (along its own axis) and thus insures load equalization between helices, thus insuring a minimum of side thrust transmitted to the valve member 36.

*Power steering*

The hydraulic system is a constant pressure system and the valve means is of the closed-center type; although, these characteristics do not limit the applicability of the invention. In any event, when the pump P is driven by the power source 28 on the tractor, the shuttle valve means 68 responds thereto to assume its Fig. 2 position. When the steering wheel 22 is turned to the right (clockwise as seen in Fig. 2), the shaft 24 follows that direction and shifts the control valve member 36 to the left. As the steering wheel is turned, the pump gears 108 and 110 are, of course, hydraulically locked, and the lost-motion between the pin 144 and the furcations 136 on the steering shaft 24 enables limited turning of the steering wheel. Since the steering shaft is keyed to the valve member 36 at 134—136 and since the sleeve 142 is rigid on the valve member, the helical slots 148, running on the temporarily fixed pin 144, effect the leftward movement of the valve member. When the valve member moves to the left, the groove between the lands 128 and 130 interconnects the inlet port 38 and right hand motor port 40 and fluid from the discharge side 66 of the pump P reaches the end 54 of the motor 18 via 78—124—122—72—80—38—40—60, thus causing the piston 58 to move to the right to incur clockwise turning of the steerable wheel supporting shaft 16 via the rack and pinion means 20. As fluid is exhausted from the opposite end 56 of the motor 18, it returns via the line 62 to the port 42 of the control valve means V. The port 42 is now connected to the port 46, because leftward movement of the control valve member 36 places the groove between the lands 130 and 132 to the left of the position shown in Fig. 2, whereby the returning fluid from the motor 18 reaches the device S via 46 and 102. The device at this time is operating as a motor and the side 106 is its intake side. Consequently, the returning fluid at 102—106 will rotate the gears in the directions of the arrows (Fig. 2), or in directions the same as those in which the gears would be turned by the steering wheel. Since leftward shifting of the valve 36 interconnects the ports 44 and 48 via the groove between the lands 126 and 128, the device S is no longer hydraulically locked and fluid discharged at 104 reaches the reservoir via 44—48—84—82—74—76—88—90.

As has already been pointed out, the device S is on the return side of the motor 18. One advantage of this arrangement is that it enables the use of a gear pump, which is considerably cheaper than a vane pump. It is known, of course, to utilize a pump on the pressure side of a motor such as the motor 18, but experience has shown that it is difficult to motor a gear pump under high pressure in this situation. The present arrangement avoids these difficulties. In other words, the device S acts as a flow meter in the low-pressure return fluid. Thus, the present arrangement takes advantage of the fact that the metering function depends on quantity and not pressure of fluid and avoids the complications noted above.

Steering to the left will be accomplished in a manner just the reverse of that described above. That is, when the steering wheel 22 and shaft 24 are turned to the left, the main pump P is still connected to the control valve V at 38 but fluid under pressure is now supplied to the end 56 of the motor and return fluid is exhausted from the other end 54. The device S is now turned in the opposite direction and the side 104 becomes its intake side and the servo or follow-up action, tending to return the control valve to neutral, still obtains.

In this respect, and regardless of whether a right or a left turn is being effected, it should be noted that the gears 108 and 110 are turned in the same direction by fluid as they are or would be turned by the steering shaft 24. Thus, the gears are enabled to "catch up" with the steering shaft when the operator ceases turning that shaft, whereupon the control valve member is automatically returned to neutral. Mechanisms of this general character are of course well-known but the present construction is novel in detail. As is typical of these designs, as long as the steering wheel is being turned, the valve will be kept open or in its active status but, as soon as turning of the steering wheel ceases, the return fluid from the motor 18 creates the follow-up function just described.

*Manual steering*

The purpose of the manual operability of the system is to have available a means for steering the vehicle in the event of failure of the power driven pump P. In the present system, the device S is used as a pump for supplying fluid under pressure to the motor 18. In the event that the pump P fails, there will no longer be pump pressure to maintain the Fig. 2 position of the shuttle valve means 68, whereupon this valve will move to the position of Fig. 3, thus disconnecting the ports 74 and 76. Initial turning of the steering wheel 22, to the right (clockwise as seen in Fig. 2), for example, will cause leftward shifting of the control valve member 36, connecting the ports 38 and 40 and the ports 44 and 48, along with effecting a connection of the ports 42 and 46.

As the lost-motion at 136—144 is picked up between the steering shaft and the pin 144, the steering shaft drives the gear 108 of the pump S and the side 104 becomes the discharge side of the pump for the transmission of fluid under pressure via the line 100, port 44, port 48, line 84—82, ports 74 and 72 in the shuttle valve means and line 80 to the control valve means inlet port 38. At this time, fluid under pressure is supplied to the end 54 of the motor 18 and exhaust fluid from the end 56 of that motor is returned to the intake side 106 of the pump. Any deficiency of fluid will be made up through the make-up valves 96 and 98. Manual steering to the left is accomplished in the reverse manner and fluid deficiencies if any are made up through the make-up valve 96.

The disconnection of the ports 74 and 76 by the shuttle valve 68 is significant in manual steering because it cuts off the line 82 from the reservoir line 88 and establishes the manual steering circuit. This is a characteristic of placing the device S in the low pressure return line 62 (or 60) from the motor 18 instead of in the high pressure line as in prior systems; that is to say, with S in the return line, its discharge during power steering is to reservoir but in manual steering its discharge must be used to pressurize the motor 18. Hence, the escape to reservoir is blocked by the shuttle valve 68, which operates automatically in response to failure of pump P.

*Summary*

The dual-function device S operates as a motor to achieve a servo or follow-up action and as a pump to enable manual steering. The improved connection among the steering shaft, valve 36 and device S is advantageous for the reasons outlined above. Of particular significance is the location of the device S on the return side of the motor 18, plus the utilization of the motor 18 as a sensing element, thus avoiding the necessity for a separate element for that purpose. Other features and advantages of the invention will undoubtedly occur to those versed in the art, as will many modifications and alterations in the preferred embodiment illustrated, all of which may be achieved without departure from the spirit and scope of the invention.

What is claimed is:

1. A hydraulic steering system for a vehicle having a power source, a steering wheel, and a steerable wheel comprising: a hydraulic motor connected to the steerable wheel and having pressure and return sides; a first power-source-driven pump having intake and discharge sides; a second, normally idle pump having intake and discharge sides; shuttle valve means having a first pump port connected to the discharge side of the first pump, a second pump port, a supply port and an exhaust port and a valve member for controlling said ports operative in a first condition in response to first pump pressure to interconnect the supply and first pump ports and to interconnect the exhaust and second pump ports, and operative in a second condition responsive to absence of said pressure to interconnect the supply and second pump ports exclusively of said other ports; control valve means changeable from a neutral status to an active status to connect the supply port to the pressure side of the motor, to connect the return side of the motor to the intake side of the second pump and to connect the discharge side of said second pump to the second pump port of the shuttle valve means so that in the first condition of the shuttle valve member, the first pump operates as the sole means for pressurizing the motor while the second pump is motored by return flow from the motor and discharges to the exhaust port and so that alternately, in the second condition of said shuttle valve member, the second pump operates via its discharge side, the second pump port and the supply port as the sole means for pressurizing the motor means operative in response to turning of the steering wheel to change the control valve means to its active status to drive the second pump; and means responsive to cessation of turning of the steering wheel to incur return of the control valve means to its neutral status.

2. A hydraulic steering system for a vehicle having a power source, a steering wheel, and a steerable wheel comprising: a hydraulic motor connected to the steerable wheel and having pressure and return sides; a first power-source-driven pump having intake and discharge sides; a second, normally idle pump having intake and discharge sides; shuttle valve means having a first pump port connected to the discharge side of the first pump, a second pump port, a supply port and an exhaust port and a valve member for controlling said ports operative in a first condition in response to first pump pressure to interconnect the supply and first pump ports and to interconnect the exhaust and second pump ports, and operative in a second condition responsive to absence of said pressure to interconnect the supply and second pump ports exclusively of said other ports; control valve means changeable from a neutral status to an active status to connect the supply port to the pressure side of the motor, to connect the return side of the motor to the intake side of the second pump and to connect the discharge side of said second pump to the second pump port of the shuttle valve means so that in the first condition of the shuttle valve member, the first pump operates as the sole means for pressurizing the motor while the second pump is motored by return flow from the motor and discharges to the exhaust port and so that alternately, in the second condition of said shuttle valve member, the second pump operates via its discharge side, the second pump port and the supply port as the sole means for pressurizing the motor and means operatively interconnecting the control valve means and the steering wheel for changing the positions of the valve by the steering wheel.

3. A hydraulic steering system for a vehicle having a power source, a steering wheel, and a steerable wheel comprising: a hydraulic motor connected to the steerable wheel and having pressure and return sides; a first power-source-driven pump having intake and discharge sides; a second, normally idle pump having intake and discharge sides; control valve means including fluid-pressure transmitting connections among the first and second pumps and the motor and a valve member changeable from a neutral status to an active status for controlling said connections to connect the discharge side of the first pump to the pressure side of the motor exclusively of the second pump, to connect the return side of the motor to the intake side of the second pump and to exhaust the discharge side of said second pump; means operative in response to turning of the steering wheel to change the control valve means to its active status to drive the second pump; and means responsive to cessation of turning of the steering wheel to incur return of the control valve means to its neutral status.

4. A hydraulic steering system for a vehicle having a power source, a steering wheel, and a steerable wheel comprising: a hydraulic motor connected to the steerable wheel and having pressure and return sides; a first power-source-driven pump having intake and discharge sides; a second, normally idle pump having intake and discharge sides; a control valve including fluid-pressure transmitting connections among the first and second pumps and the motor and a valve member having a neutral position isolating the motor from both pumps and blocking the discharge side of the second pump and shiftable to an active position for controlling said connections to connect the discharge side of the first pump to the pressure side of the motor independently of the second pump and simultaneously to connect the return side of the motor to the intake side of the second pump and to exhaust the discharge side of said second pump so that return flow from said return side of the motor causes motoring of said second pump; driving means between the steering wheel and the second pump including a lost-motion device enabling limited turning of the steering wheel relative to the second pump while the discharge side of said second pump is blocked by the neutrally positioned control valve; means operative by said limited relative turning of the steering wheel to shift the control valve to its active position; and means operative in response to cessation of steering wheel turning to return the control valve to its neutral position as return flow from the return side of the motor to the intake side of the second pump drives said second pump in follow-up relation to the stopped steering wheel.

5. A hydraulic steering system for a vehicle having a power source, a steering wheel, and a steerable wheel comprising: a hydraulic motor connected to the steerable wheel and having pressure and return sides; a first power-source-driven pump having intake and discharge sides; a second, normally idle pump having intake and discharge sides; a control valve including fluid-pressure transmitting connections among the first and second pumps and the motor and a valve member having a neutral position isolating the motor from both pumps and blocking the discharge side of the second pump and shiftable to an active position for controlling said connections to connect the discharge side of the first pump to the pressure side of the motor independently of the second pump and simultaneously to connect the return side of the motor to the intake side of the second pump and to exhaust the discharge side of said second pump so that return flow from said return side of the motor causes motoring of said second pump; driving means interconnecting the second pump, the steering wheel and the valve and including a lost-motion driving connection between the steering wheel and idle second pump enabling turning of the steering wheel to overrun said second pump in a limited amount and to thereby shift said control valve to its active position and a follow-up connection between said control valve and the second pump to return the control valve to its neutral position when the steering wheel stops and return flow from the return side of the motor causes said second pump to catch up with the steering wheel.

6. A hydraulic system, comprising: a hydraulic motor having pressure and return sides; a first, power-driven pump having intake and discharge sides; a second, normally idle pump having intake and discharge sides; shuttle valve means having a first pump port connected to the discharge side of the pump, a second pump port, a supply port and an exhaust port and a valve member for controlling said ports operative in a first condition in response to first pump pressure to interconnect the supply and first pump ports and to interconnect the exhaust and second pump ports, and operative in a second condition responsive to absence of said pressure to interconnect the supply and second pump ports exclusively of said other ports; control valve means changeable from a neutral status to an active status to connect the supply port to the pressure side of the motor, to connect the return side of the motor to the intake side of the second pump and to connect the discharge side of said second pump to the second pump port of the shuttle valve means so that in the first condition of the shuttle valve member, the first pump operates as the sole means for pressurizing the motor while the second pump is motored by return flow from the motor and discharges to the exhaust port and so that alternately, in the second condition of said shuttle valve member, the second pump operates via its discharge side, the second pump port and the supply port as the sole means for pressurizing the motor; a normally idle control member movable to change the control valve means to its active status to drive the second pump; and means responsive to cessation of movement of the control member to incur return of the control valve means to its neutral status.

7. A hydraulic system, comprising: a hydraulic motor having pressure and return sides; a first, power-driven pump having intake and discharge sides; a second, normally idle pump having intake and discharge sides; shuttle valve means having a first pump port connected to the discharge side of the first pump, a second pump port, a supply port and an exhaust port and a valve member for controlling said ports operative in a first condition in response to first pump pressure to interconnect the supply and first pump ports and to interconnect the exhaust and second pump ports, and operative in a second condition responsive to absence of said pressure to interconnect the supply and second pump ports exclusively of said other ports; and control valve means changeable from a neutral status to an active status to connect the supply port to the pressure side of the motor, to connect the return side of the motor to the intake side of the second pump and to connect the discharge side of said second pump to the second pump port of the shuttle valve means so that in the first condition of the shuttle valve member, the first pump operates as the sole means for pressurizing the motor while the second pump is motored by return flow from the motor and discharges to the exhaust port and so that alternately, in the second condition of said shuttle valve member, the second pump operates via its discharge side, the second pump port and the supply port as the sole means for pressurizing the motor.

8. A hydraulic system, comprising: a hydraulic motor having pressure and return sides; a first, power-driven pump having intake and discharge sides; a second, normally idle pump having intake and discharge sides; control valve means including fluid-pressure transmitting connections among the first and second pumps and the motor and a valve member changeable from a neutral status to an active status for controlling said connections to connect the discharge side of the first pump to the pressure side of the motor independently of the second pump and simultaneously to connect the return side of the motor to the intake side of the second pump and to exhaust the discharge side of said second pump so that return flow from said return side of the motor causes motoring of said second pump; a normally idle control member movable to change the control valve means to its active status to drive the second pump; and means responsive to cessation of movement of the control member to incur return of the control valve means to its neutral status.

9. A hydraulic steering system for a vehicle having a power source, a steering wheel, and a steerable wheel, comprising: a hydraulic motor connected to the steerable wheel and having pressure and return sides; a power-source-driven pump having intake and discharge sides; a normally idle second pump having intake and discharge sides; control valve means including fluid-pressure transmitting connections among the first and second pumps and the motor and a valve member changeable from a neutral status to an active status for controlling said connections to connect the discharge side of the power-source-driven pump to the pressure side of the motor exclusively of the second pump and to simultaneously connect the return side of said motor to the intake side of the second pump for driving said second pump as a motor; and means interconnecting the steering wheel, the second pump and the control valve means for incurring the active status of the control valve means in response to turning of the steering wheel while the second pump is idle and for returning the control valve means to its neutral status in response to driving of the second pump from the return side of the motor while the steering wheel is idle.

10. A hydraulic control system for a mechanism having a power source, a control member, and a movable member, comprising: a hydraulic motor connected to the movable member and having pressure and return sides; a power-source-driven pump having intake and discharge sides; a normally idle second pump having intake and discharge sides; control valve means including fluid-pressure transmitting connections among the first and second pumps and the motor and a valve member changeable from a neutral status to an active status for controlling said connections to connect the discharge side of the power-source-driven pump to the pressure side of the motor exclusively of the second pump and to simultaneously connect the return side of said motor to the intake side of the second pump for driving said second pump as a motor; and means interconnecting the control member, the second pump and the control valve means for incurring the active status of the control valve means in response to actuation of the control member while the second pump is idle and for returning the control valve means to its neutral status in response to driving of the second pump from the return side of the motor while the control member is idle.

11. In a fluid pressure system: a power pump; a reversible auxiliary pump; a fluid-pressure-operated motor; a member drivingly connected to the auxiliary pump and having lost-motion means enabling the member to have limited travel relative to the auxiliary pump and enabling said auxiliary pump to catch up with the member; a control valve having operating connections to the member and auxiliary pump and neutrally positioned to fluid-lock the motor and auxiliary pump, said control valve being actively positionable by travel of the member relative to the fluid-locked auxiliary pump to incur pressurizing of the motor at one end by the power pump and motoring of the auxiliary pump by return flow from the other end of said steering motor to one side of said auxiliary pump, and said control valve being returnable to neutral when the motored auxiliary pump catches up with the member; and selector valve means operative in a first condition when the power pump is active to connect the power pump directly to the control valve independently of the auxiliary pump and to connect the other side of said auxiliary pump to reservoir to enable motoring thereof, said selector valve means being operative in a second condition when the power pump is inactive to connect said other side of the auxiliary pump to the control valve instead of to reservoir and to cut off the power pump from the control valve whereby the auxiliary pump may be operated by the aforesaid member to pressurize the motor.

12. The invention defined in claim 11, including: means biasing the selector valve means to its second condition; and means responsive to fluid pressure from the active power pump to achieve the first condition of said selector valve means.

13. In a fluid pressure system; a fluid-pressure-operated motor; control valve means having motor ports connected respectively to opposite ends of the motor, an inlet port, a return port, and a valve member actively positionable to connect one motor port to the inlet port and to connect the other motor port to the return port; a power pump having a discharge side; an auxiliary device alternately serviceable as a motor or as a pump and having an intake side connected to the return port of the control valve means and also having a discharge side; and selector valve means operative in a first condition connecting the discharge side of the power pump to the inlet port exclusively of the auxiliary device and connecting the discharge side of the auxiliary device to reservoir so that the auxiliary device is motored by return flow from the return port, and operative in a second condition connecting the discharge side of said auxiliary device to the inlet port in substitution for the power pump so that the device is serviceable as a pump to operate said motor.

14. In a fluid pressure system: a two-way fluid-pressure-operated motor; a power pump; a reversible auxiliary fluid-pressure device alternately operative as a motor or as a pump and having opposite sides alternately serviceable as intake and discharge sides, depending upon the direction of operation; a supply line; a reservoir line; control valve means connected to the supply line and having a pair of motor ports connected respectively to opposite ends of the motor, a pair of return lines connected respectively to opposite sides of the auxiliary device, a pair of reservoir ports connected to the reservoir line, and a control valve member selectively settable at either side of a neutral position to connect the supply line to one motor port, the other motor port to one return port and the other return port to one reservoir port complete a circuit from the supply line to the motor via the control valve and from the motor to the reservoir line via the control valve and the auxiliary device; and selector valve means operative in a first condition to connect the supply line to the power pump exclusively of the auxiliary device and to connect the reservoir line to reservoir so that said circuit is pressurizable by the power pump to operate said motor and to operate said device as a motor, said selector valve means being operative in a second condition to connect the reservoir line to the supply line in substitution for the power pump to establish a device-to-control valve-to-motor circuit enabling operative of said device as a pump to pressurize the motor independently of the power pump.

15. In a vehicle steering system: a support; a steering shaft journaled on the support; a valve shiftable along the axis of the steering shaft; key means interconnecting the shaft and valve for turning in unison but enabling shifting of the valve relative to the shaft; a fluid motor having a rotatable member coaxial with the shaft and adapted to be selectively fluid-locked or fluid-driven; and means interconnecting the shaft, the motor member and the valve for effecting shifting of the valve upon turning of the shaft while the member is fluid-locked and for re-shifting the valve when the shaft is held and the member is fluid-driven, said interconnecting means comprising a sleeve fixed to the valve and coaxially receiving the shaft, a hub on the member encircling the sleeve, and a cross member extending through the hub and sleeve and into the shaft, said sleeve having a helical slot therein receiving the cross member.

16. The invention defined in claim 15, in which: the cross member has a head portion received by the hub, a reduced shank portion received by the shaft and an interconnecting slot-received portion between said head and shank portions and of tapered shape; and said slot has tapered walls conforming to said tapered shape.

17. The invention defined in claim 16, in which: the cross member extends diametrically through the hub, sleeve and shaft and has a similar head and a similar tapered portion at its opposite end, the sleeve has another helical slot diametrically opposite the mentioned slot and said other slot receives and has tapered walls conforming to said similar tapered portion.

References Cited in the file of this patent

UNITED STATES PATENTS

| | | |
|---|---|---|
| 2,020,951 | Lemon | Nov. 12, 1935 |
| 2,321,377 | French | June 8, 1943 |
| 2,334,918 | French | Nov. 23, 1943 |
| 2,512,979 | Strother | June 27, 1950 |
| 2,614,644 | Gustafson | Oct. 21, 1952 |
| 2,836,258 | Livers | Mar. 11, 1958 |